United States Patent
Bertolini et al.

[11] Patent Number: 6,028,379
[45] Date of Patent: Feb. 22, 2000

[54] ARRANGEMENT FOR THE VIBRATION ISOLATING MOUNTING OF AN ELECTRIC MOTOR

[75] Inventors: Thomas Bertolini, Rheinau; Jürgen Schöne, Bad Mergentheim; Gunter Streng, Schrozberg; Martin Baer, Mulfingen, all of Germany

[73] Assignee: Ebm Werke GmbH & Co., Mulfingen, Germany

[21] Appl. No.: 09/220,241

[22] Filed: Dec. 23, 1998

[30] Foreign Application Priority Data

Dec. 24, 1997 [DE] Germany ............................ 297 22 852
Jul. 22, 1998 [EP] European Pat. Off. ............ 98 113 652

[51] Int. Cl.[7] ................................. H02K 5/24; H02K 5/26
[52] U.S. Cl. ............................... 310/51; 310/91; 248/604; 248/638
[58] Field of Search .................................. 310/51, 89, 91, 310/67 R; 248/573, 604, 603, 638, 660, 664

[56] References Cited

U.S. PATENT DOCUMENTS

| 2,874,008 | 2/1959 | Orte et al. | 310/51 |
| 2,905,411 | 9/1959 | Cunningham | 310/51 |
| 3,323,763 | 6/1967 | Butts | 310/51 |
| 4,161,667 | 7/1979 | Buckman et al. | 310/51 |
| 5,521,447 | 5/1996 | Bertolini et al. | 310/51 |

FOREIGN PATENT DOCUMENTS

| 2219182 | 11/1973 | Germany . |
| 3823447 | 1/1990 | Germany . |
| 9100952 | 7/1991 | Germany . |

Primary Examiner—Nestor Ramirez
Assistant Examiner—Karl E. Tamai
Attorney, Agent, or Firm—Harness, Dickey & Pierce, LLC

[57] ABSTRACT

The present invention relates to an arrangement for the vibration-isolating mounting of an electric motor (2) on a support part (6) via an essentially disk-shaped support element (12). The support element (12) has a motor-holding section (24) for connection to the electric motor (2) and a support-holding section (26) for connection to the support part (6), and the two holding sections (24, 26) are connected via elastic, web-like connecting pieces (28). The connecting pieces (28) are designed such that the two holding sections (24, 26) are elastically movable relative to each other three-dimensionally in all directions in space, specifically axially, radially and tangentially, over a certain movement play. The support element (12) has integrated stop means for the three-dimensional limiting of the elastic relative movements of the holding sections (24, 26) and/or an additional mass (110) to influence the vibration behavior.

20 Claims, 9 Drawing Sheets

ARRANGEMENT FOR THE VIBRATION ISOLATING MOUNTING OF AN ELECTRIC MOTOR

BACKGROUND OF THE INVENTION

The present invention relates to an arrangement for the vibration-isolating mounting of an electric motor on a support part via an essentially disk-shaped support element, the support element having a motor-holding section for connection to the electric motor and a support-holding section for connection to the support part, and the two holding sections being connected via elastic, web-like connecting pieces.

Such a mounting for a motor is disclosed in DE-A 2 219 182. It is intended to be used to reduce tangential and radial vibration. In this, there is provided a support element, called a supporting member therein, which consists of an outer ring on the housing side, an inner ring which is connected to the motor and of essentially radial, elastic webs which connect the two rings in one piece. There is additionally provided a separate abutment in the form of a ring element which is placed axially onto the support element. The abutment part has stop webs having boundary surfaces in such a manner that, in interaction with limit stops provided on the inner ring of the support element, limiting of the tangential and radial vibrating movements of the motor is ensured. However, there is no provision for limiting movement axially. This known arrangement is only suitable for mounting relatively small, lightweight electric motors, such as are used, for example, in office machines.

German Patent 38 23 447 describes a fan which is operated by an electric motor and has a very similar mounting. To isolate noise, there is provided within a fan housing a disk-shaped component which is arranged transversely to the rotational axis of the fan, whose outer region is held on the inner surface of the housing, and to whose central region the fan, i.e. the motor with a fan wheel, is connected. In this case, the outer region is connected in one piece to the central region via a plurality of elastic webs. However, only an axial limiting stop is provided directly between the fan and the housing in this case, by the fan having two shoulders which point away from one another in the direction of the rotational axis of the fan and to which mating shoulders of the housing are assigned at a distance. The elastic webs have such a profile, for example, spiral or S-shaped, that their inner and outer attachment points on the central region and on the outer region are in each case offset with respect to one another in the circumferential direction by a certain angle α. This known arrangement is likewise only provided for relatively small fans, such as are used in motor vehicles for sensory detection of temperature in conjunction with the control of an air-conditioning system.

Finally, a further arrangement of this type is disclosed in German Utility Model 91 00 952. This also specifically concerns a sensory-operated cooling fan for use for controlling an air conditioning system in a motor vehicle. Moreover, in this case only an axial limiting stop is provided, specifically directly between a housing cover and the elastic webs of the support disk.

Proceeding from the described prior art, the present invention is based on the object of providing an arrangement of the generic type which ensures effective vibration isolation even in the case of relatively large and heavy electric motors, such as are used, for example in heating fans (burner fans).

According to the invention, this is achieved by connecting pieces designed such that the two holding sections are elastically movable relative to each other three-dimensionally in all directions in space, specifically axially, radially and tangentially, in each case over a certain movement play. The support element includes integrated stop means for three-dimensional limiting of the elastic relative movements of the holding sections. It is advantageous to form the stop means at least partially from elements of the holding sections. The elements are elastically deformable such that relative movements are elastically absorbed and are thereby retarded relatively gently. Hard knocks are thereby avoided.

Even in the case of large and heavy motors which, if appropriate, form a unit together with a driven part, for example a fan wheel, the refinement according to the invention makes it possible reliably to avoid direct impacts occurring between the motor parts and housing parts so that unbalanced displacements possibly resulting therefrom are also virtually eliminated. The stop means according to the invention are effective, on the one hand, in the operating state if, for example, relative movements occur because of sudden changes in rotational speed. On the other hand, effective safety during transport is also achieved, according to the invention, in that even in the case of abrupt movements of the entire particular apparatus, for example a fan, all relative movements are very gently intercepted via the novel stop means of the support element.

For the preferred use in the case of relatively large and heavy motors it is above all expedient to connect the two holding sections and the connecting pieces, as originally separate component parts, together in a suitable manner. The connecting pieces are preferably connected in the radial outer region of the support-holding section and in the radially inner region of the motor-holding section, specifically, in particular via non-positive- and/or positive-locking connections. In principle, however, a reversed arrangement of the connecting pieces can also be provided, i.e. they can be connected on the outside to the motor-holding section and on the inside to the support-holding section. Because the component parts are originally separate the advantageous possibility arises of producing the holding sections and the connecting pieces from different materials. It is particularly expedient to produce the holding sections from a certain plastic material and the connecting pieces in particular from metal (spring steel plate). As a result, particularly high masses and bearing pressures can be supported. Furthermore, simple exchange or simple selection of the connecting pieces, which are in each case of appropriately different design, enables rapid adaptation to different requirements in the particular application.

In a preferred application, the support element is arranged axially between the support part—formed in particular by an essentially planar housing wall of a fan—and the electric motor, the electric motor serving to drive a fan wheel. In this case, a motor shaft extends centrally through the support element and through an opening in the fan housing wall and within the fan housing is connected to the fan wheel. Consequently, in this case the support-holding section is connected, on its side which is axially remote from the electric motor, to the support part, while the motor-holding section is connected, on its side which is axially remote from the support part, to the electric motor. For this purpose, the two holding sections each have disk-shaped wall sections which are spaced apart axially from one another. The support element according to the invention is basically thus a double disk with the connecting pieces being arranged axially in between. The holding sections have, for this purpose, sections which extend axially radially inward and outward, overlap in the radial direction and between which the connecting pieces extend. In this manner, the holding sections in practice form a receiving housing which axially and radially surrounds the connecting pieces. In so doing, provision is made, to form the stop means, for the two holding sections to interlock in some regions radially or axially with a corresponding movement play.

Further advantageous features for refining the invention are contained in the subclaims and the following description.

The invention will be explained in more detail below with reference to a preferred exemplary embodiment which is illustrated in the drawing, in which:

BRIEF DESCRIPTION OF THE DRAWINGS

In the various figures of the drawing, identical parts are always provided with the same reference numbers and are therefore generally only described once in each case.

DETAILED DESCRIPTION OF THE PREFERRED EMBODIMENT

Figure 1:
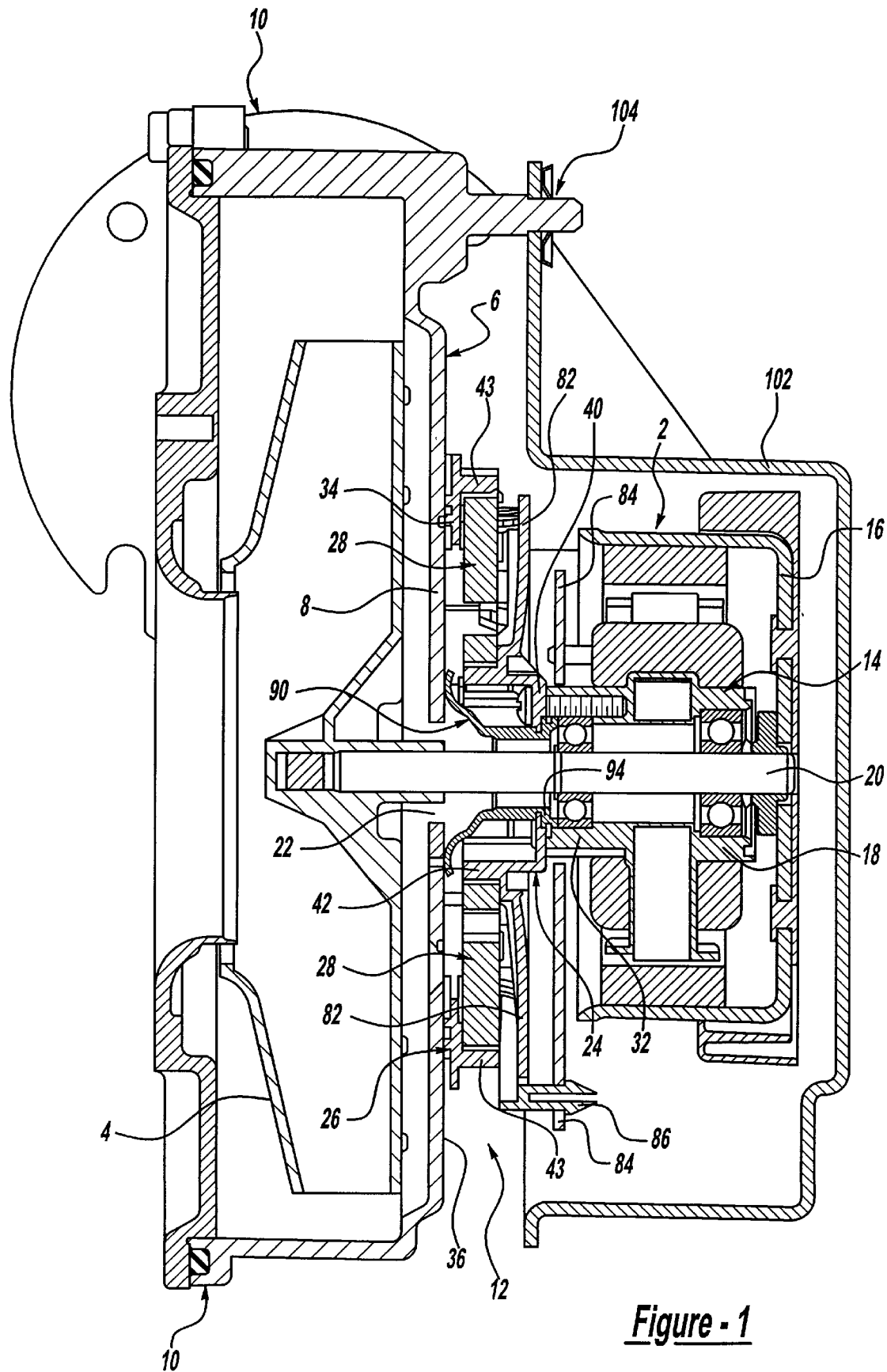
FIG. 1 shows, as an application example, an axial section through a radial fan having an arrangement according to the invention for the vibration-isolating mounting of an electric motor on a housing wall, acting as a support part, of the fan housing.

In the preferred application example which is illustrated in FIG. 1, an electric motor 2 is provided to drive a fan wheel 4 and, for this purpose, is mounted on a housing wall 8, acting as support part 6, of a fan 10 (designed here as a radial fan), specifically, via an essentially disk-shaped support element 12. The electric motor 2 is preferably designed as an external rotor motor, a stator 14 being surrounded by an external rotor 16. The external rotor 16 is connected in a rotationally fixed manner to the fan wheel 4 via a motor shaft 20, mounted rotatably within a bearing support tube 18 of the stator 14, with the result that the electric motor 2, together with the fan wheel 4, in practice forms a unit which is fastened to the housing wall 8 via the support element 12. At the same time, the motor shaft 20 extends through a central opening 22 in the housing wall 8 into the housing of the fan 10.

In this case, the support element 12 is arranged axially between the electric motor 2 and the support part 6 or the housing wall 8 of the fan 10. The support element 12 has a motor-holding section 24, which is connected to the electric motor 2, and also a support-holding section 26 which is connected to the support part 6 or is mounted flat on the essentially planar housing wall 8. The two holding sections 24, 26 are connected to one another via elastic, web-like connecting pieces 28. According to the invention, these connecting pieces 28 are designed in such a manner that the two holding sections 24, 26—and via these also the electric motor 2 and the support part 6—are elastically movable relative to each other three-dimensionally, i.e. in all directions in space, specifically axially, radially and tangentially, in each case over a certain movement play. According to the invention, it is furthermore provided that the support element 12 has integrated stop means 30 for the three-dimensional limiting of all the elastic relative movements of the holding sections 24, 26 which are possible because of the invention. These stop means 30 are explained more precisely in the following with reference in particular to FIGS. 13 and 14.

Figure 2:
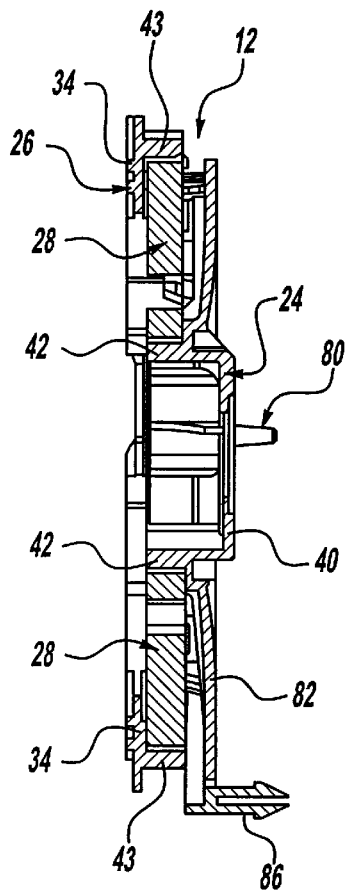
FIG. 2 shows a separate representation of the support element according to the invention in a sectional representation analogous to FIG. 1.
Figure 3:
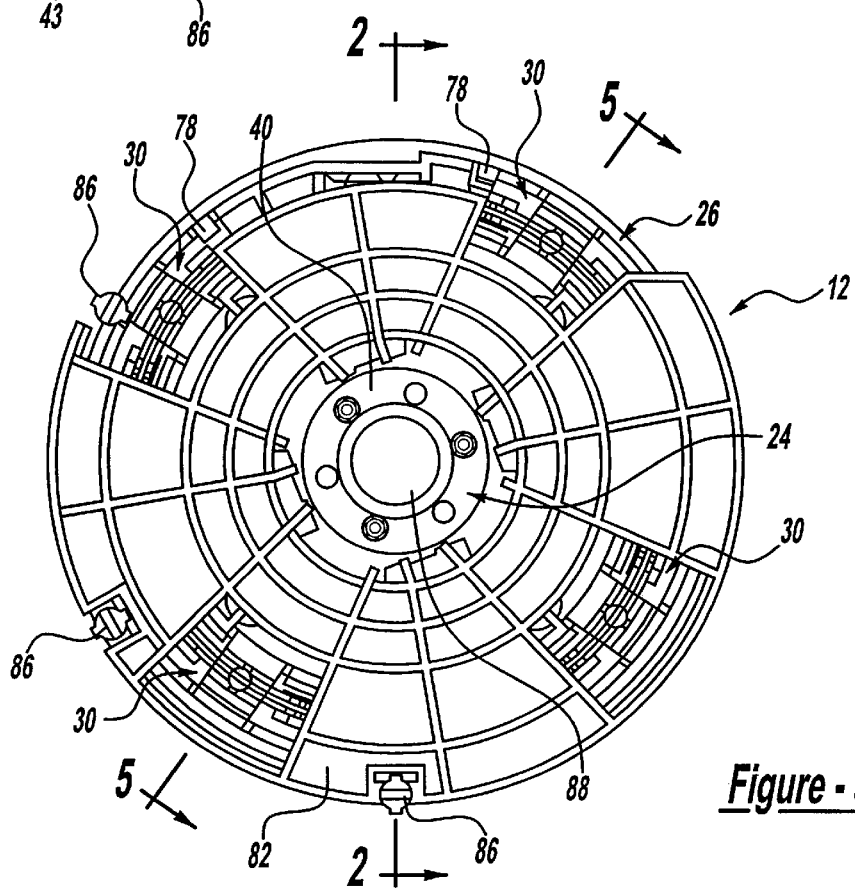
FIG. 3 shows an axial end view in the arrow direction III according to FIG. 2.

As already mentioned, the support element 12 is arranged axially between the support part 6 and the electric motor 2. In this arrangement, on the one hand, the support-holding section 26 is connected, on its side which is axially remote from the electric motor 2, to the support part 6, in particular the support-holding section 26 is fixed flat on the housing wall 8. On the other hand, the motor-holding section 24 is connected, on its side which is axially remote from the support part 6, to the electric motor 2, specifically it is screwed on, in particular with an end-insulating shank 32. The support-holding section 26 has an outer, essentially annular disk-shaped wall 34 which can be fastened flat on an assembly surface 36 of the support part 6 or the housing wall 8. The fastening preferably takes place via screws (not shown in the drawings) which engage from the inside of the fan 10 through corresponding openings in the housing wall 8 into screw holes 38 in the support-holding section 26. The motor-holding section 24 has an inner, likewise essentially annular disk-shaped wall 40 which can be fastened centrally on the electric motor 2 or on the end-insulating shank 32. According to FIGS. 1 and 2, these two walls 34 and 40 of the two holding sections 24, 26 are offset axially by a certain spacing so that the support element 12 is in practice designed as a double disk. The elastic connecting pieces 28 lie axially in the gap formed between the walls 34, 40. The holding sections 24, 26 have axial sections 42 and 43, respectively, which interlock, in each case in an axially opposed manner, and as a result overlap each other in the radial direction, with the result that the connecting pieces 28 in each case extend in an essentially radial direction between the inner section 42 and the outer section 43. In this manner, the two holding sections 24, 26 in practice form a receiving housing for the connecting pieces 28.

In the preferred exemplary embodiment shown, the two holding sections 24, 26 and the elastic connecting pieces 28 are formed by originally separate component parts. The advantageous possibility thereby arises of producing the holding sections 24, 26 and the connecting pieces 28 from different materials. The holding sections 24, 26 preferably consist of a suitable plastic material, whereas the connecting pieces 28 consist of metal, in particular spring steel plate. The connecting pieces 28 are (basically releasably) connected by their inner and outer ends to the two holding sections 24, 26 in each case preferably via non-positive and/or positive-locking connections. However, other types of connection are also entirely possible, for example, a bonded connection by molding into the plastic material (nonreleasable).

Figure 6:
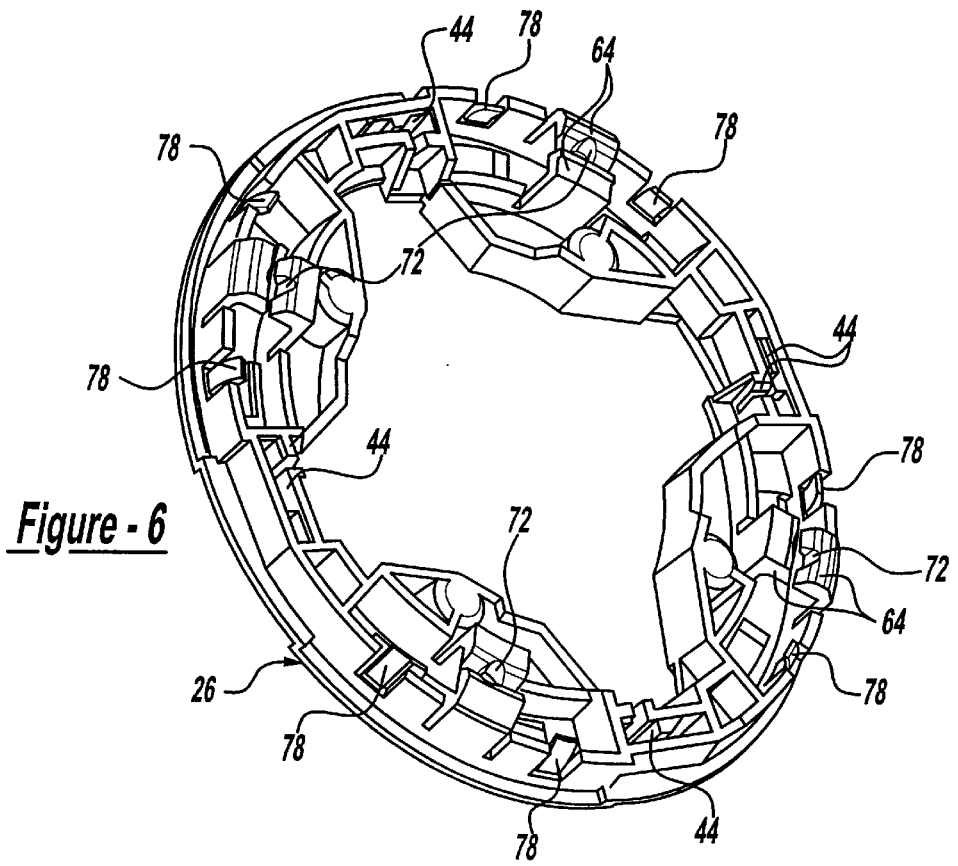
Figure 9:
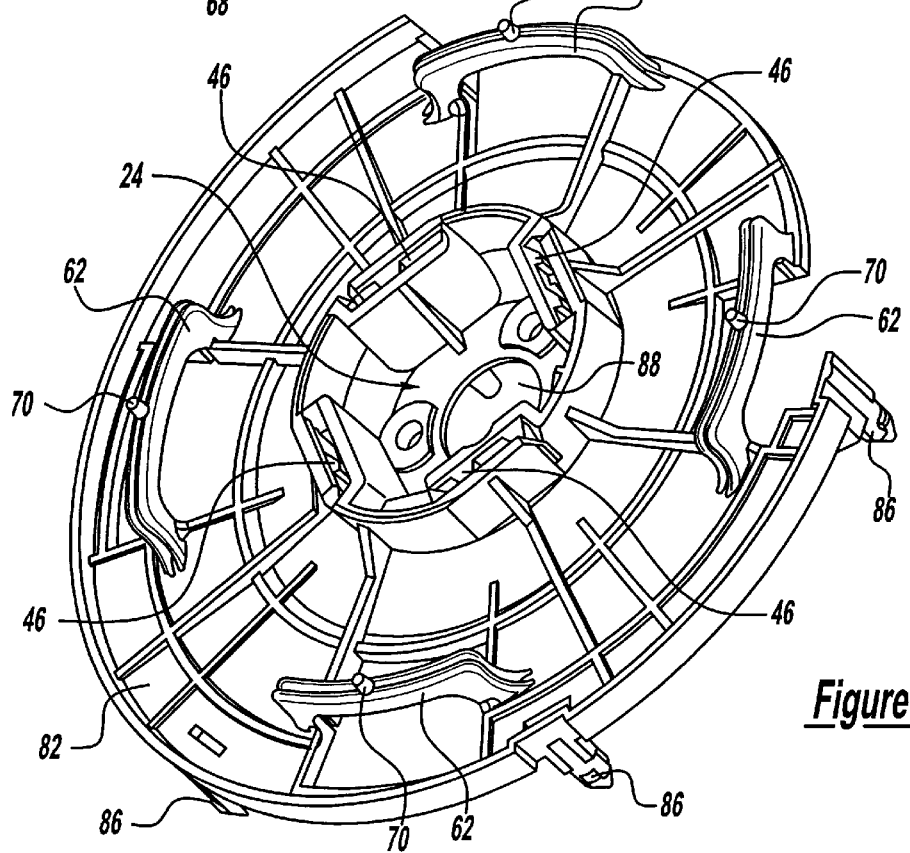
Figure 10:
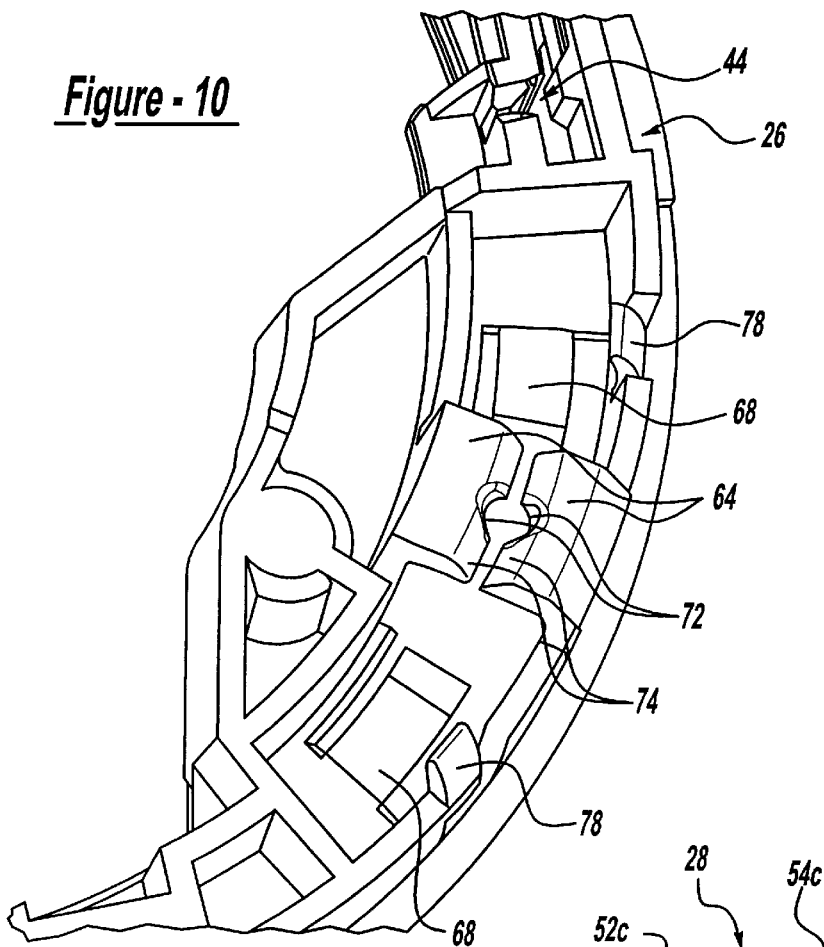
FIG. 10 shows an enlarged detail in the region X according to FIG. 6.
Figure 11:
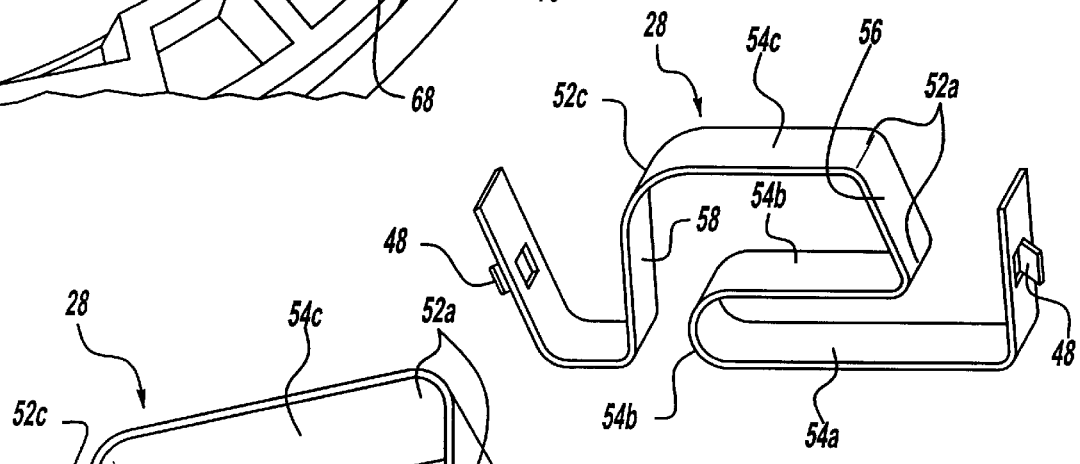
FIG. 11 shows a perspective representation of a spring elastic connecting piece, in a first embodiment.

As emerges from FIGS. 10 and 11, each connecting piece 28 is preferably inserted, by its radially outer end region, in particular non-positively and/or in a positive -locking manner, into a holding receptacle 44 of the support-holding section 26. These holding receptacles 44 can also be readily seen in FIG. 6. According to FIG. 4, the connecting pieces 28 are each seated, by their radially inner end regions, in a holding receptacle 46 of the motor-holding section 24. Reference is also made to this in FIGS. 9 and 13. In order to obtain a positive-locking or at least nonpositive mounting of the connecting pieces 28 in the holding receptacles 44, 46, according to FIG. 11 each connecting piece 28 has holding tongues 48, which are bent outwards in the manner of barbs, in its free end regions which are insertable into the receptacles.

Figure 12:
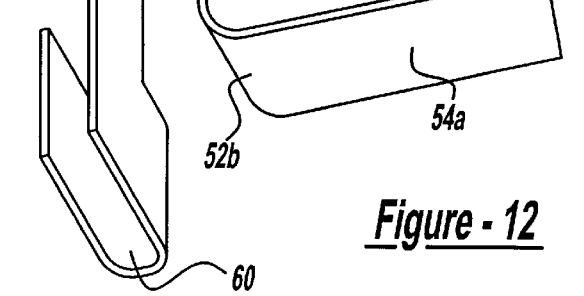
FIG. 12 shows a second possible embodiment of an elastic connecting piece.

As further emerges from FIGS. 11 and 12, each connecting piece 28 preferably consists of an elastic strip material which, with respect to its transverse axis running over the width of the strip, is aligned parallel to the motor axis (motor shaft 20). In this case, each connecting piece 28 has, between its radially outer and inner end regions, which are in particular in each case, arranged opposite each other in the radial direction approximately on the same radius, an extended profile which increases the elastic movability or deformability, and hence the relative movability of the holding sections 24, 26. In each connecting piece 28 there is expediently, between its end regions, an approximately S-shaped profile having three sections 54a, b, c which are aligned approximately radially and are connected via bends 52a, 52b. In the specific exemplary embodiment according to FIGS. 11 and 12, a first, approximately radial section 54a merges via a bend 52b of approximately 180° into a second radial section 54b. This second radial section 54b first merges via a first bend 52a of approximately 90° into an approximately tangentially arranged transition section 56, and this transition section 56 is adjoined, via a further bend 52a of 90°, by a third, approximately radial section 54c. The latter finally merges via a bend 52c, into a radially inner, approximately tangential section 58 in such a manner that the two end regions, which are to be fastened to the holding sections 24, 26, lie essentially radially opposite each other. In the design according to FIG. 12, a further 180° bend 60, which runs in the axial direction, also adjoins, in the radially inner end region. This embodiment ensures particularly effective, three-dimensional vibration isolation. As far as the inventive stop means 30 which have already been mentioned in general above are concerned, in a preferred refinement these are at least partially formed by elements of the holding sections 24, 26, which elements are elastically deformable in such a manner that impacts caused by relative movement are elastically intercepted or retarded (damped).

Figure 5:
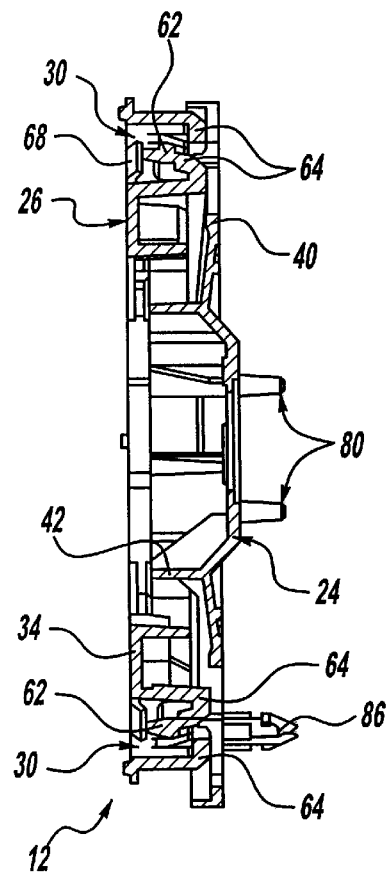
FIG. 5 shows an axial cross section in the section plane V—V according to FIG. 3, FIGS. 6 and 7 show perspective views of the two holding sections of the support element according to the invention before they are joined together.
Figure 7:
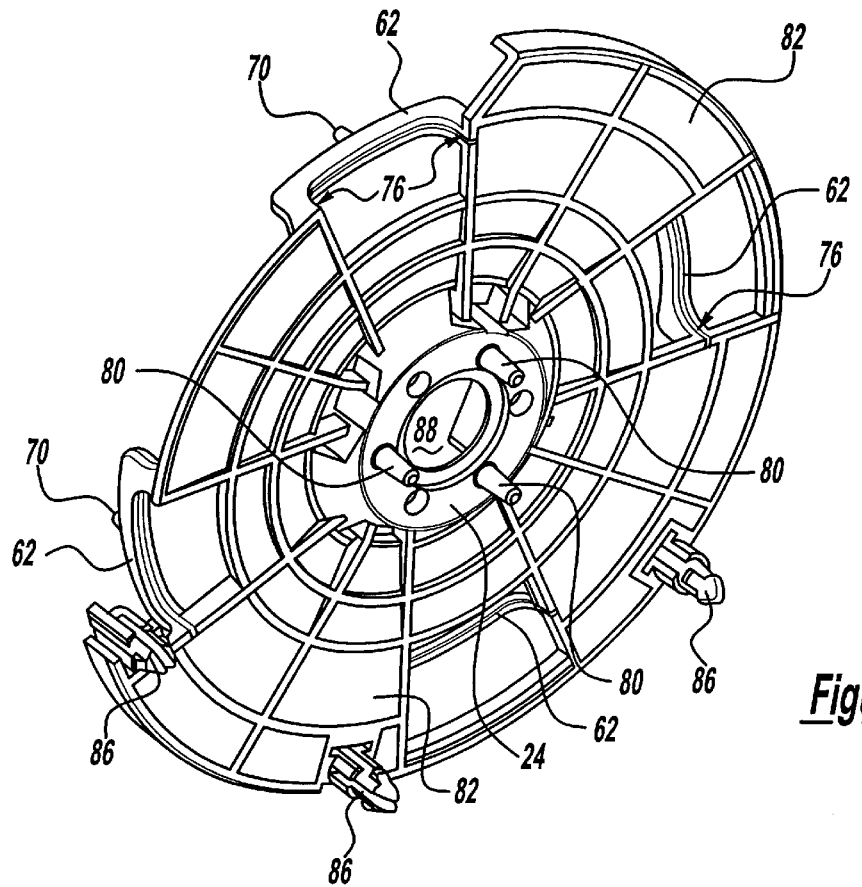
Figure 13:
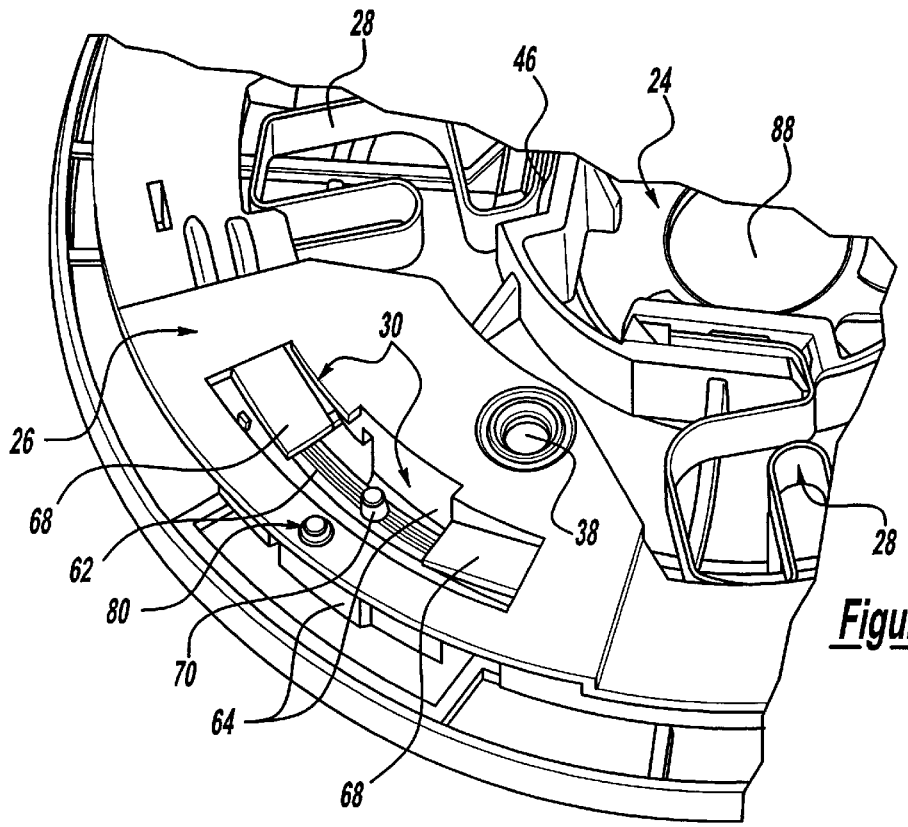
FIG. 13 shows a partial perspective view of the support element according to the invention.
Figure 14:
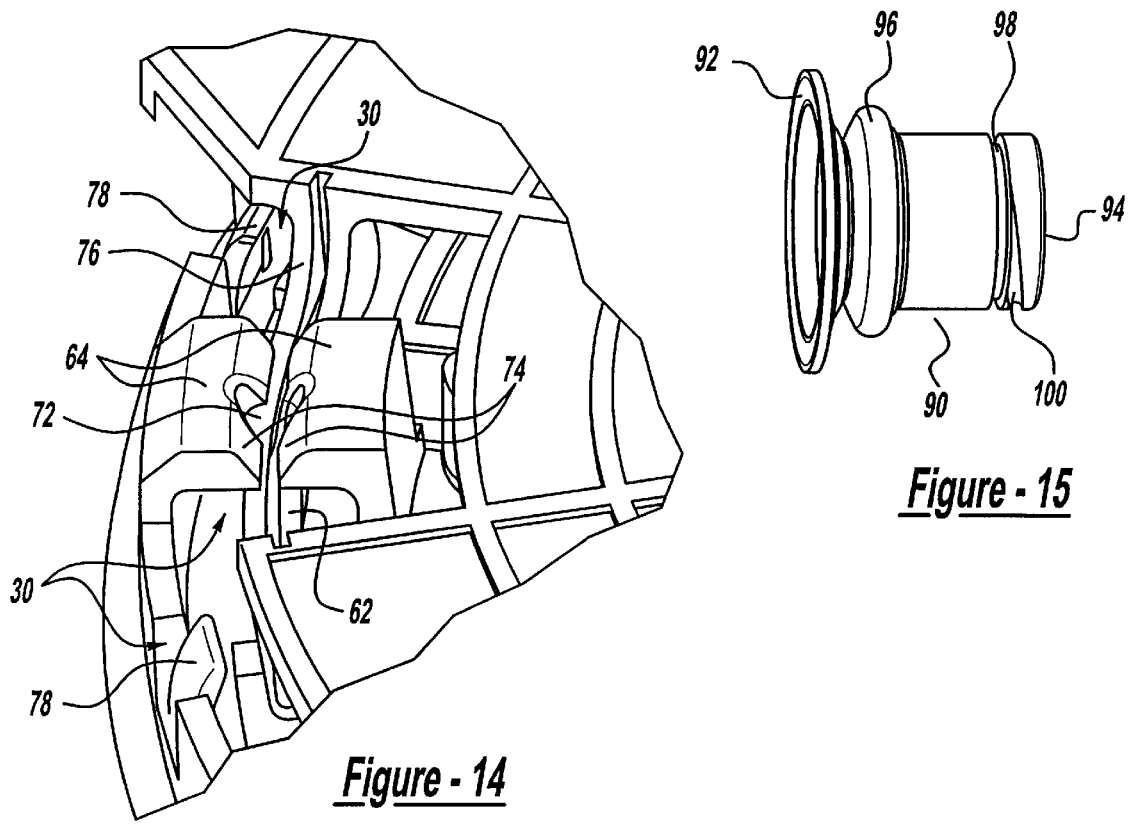
FIG. 14 shows a further detail representation of the support element according to the invention.

As emerges best from FIGS. 13 and 14, in the region of the stop means 30, the holding sections 24, 26 interlock in each case radially and axially with a corresponding movement play. The motor-holding section 24 is connected in one piece to a plurality (at least two) of stop webs 62 which are distributed over the circumference, run in particular concentrically in the shape of a circular arc in the circumferential direction and are in each case engaged around axially and radially by at least two claw-like stop pieces 64 of the support-holding section 26 (FIGS. 14 and FIG. 5). In this case, the stop pieces 64, which lie opposite one another in each case in pairs in the radial direction, are of elastically deformable design in the radial direction such that when the two holding sections 24, 26 are joined together axially (the lines 66 running between FIGS. 6 and 7), the stop web 62 can in each case be latched radially between the two stop pieces 64 associated in pairs. For this purpose, the stop pieces 64 expediently have corresponding introductory sloping surfaces 74 for the stop webs 62. The claw-like stop pieces 64 thus first ensure, in interaction with the stop webs 62, a limiting stop in an axial direction, to be precise, in that direction of movement of the electric motor 2 which points away from the fan 10. According to FIG. 13, the support-holding section 26 has, on its side which is axially opposite the claw-like stop pieces 64, stop elements 68 which are preferably designed as elastic tongues which, in each case in interaction with the stop webs 62, ensure a limiting stop, which in particular is elastic, in the other axial direction, to be precise, in that direction of movement of the electric motor 2 toward the fan 10.

In a preferred refinement, the claw-like stop pieces 64 and the stop webs 62 interact via positioning and introductory means when the two holding sections 24, 26 are joined together. As is shown, the stop webs 62 each have an axial positioning stud 70 which engages, in a position correct for joining, into a corresponding widened portion 72 formed between the two radially opposite stop pieces 64. As already mentioned, the stop pieces 64 in this case have introductory sloping surfaces 74 (FIGS. 10 and 14) such that when the stop webs 62 are introduced between the stop pieces 64, the latter are automatically spread radially until they subsequently spring back behind the particular stop web 62 and then engage radially and axially behind the web.

As furthermore emerges from FIG. 14, in the case of tangential relative movements, i.e. mutual twisting, the stop pieces 64 interact with stop surfaces 76 formed in those end regions of the stop webs 62 which point in the circumferential direction. As far as radial relative movements of the two holding sections 24, 26 are concerned, in each case at least one of the stop webs 62 interacts with at least one radially opposite, in particular elastically deformable, tongue-like stop element 78. Each stop web 62 is preferably assigned two stop elements 78 arranged, for example, in its end regions. Reference is in turn made to this primarily in FIG. 14.

Figure 8:
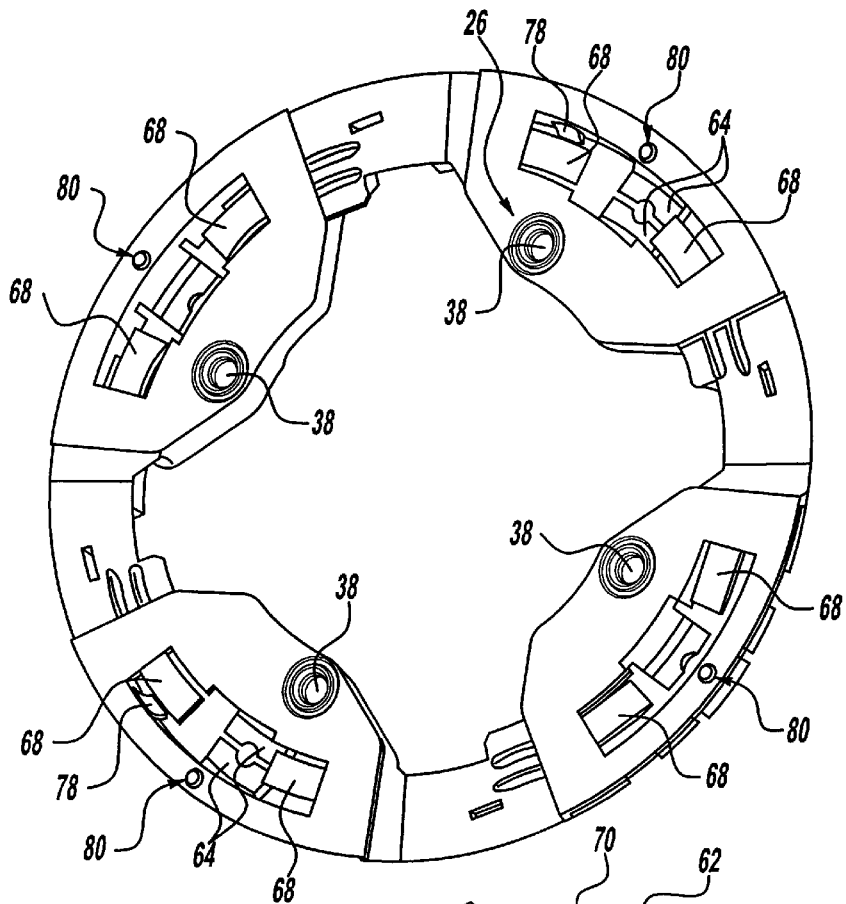
FIGS. 8 and 9 show corresponding perspective views similar to FIGS. 6 and 7, but on the respectively other side of the holding sections.

The support element 12 expediently has positioning means 80 for the positionally correct connection to the electric motor 2 and/or to the support part 6. As emerges, for example, from FIGS. 8 and 13, these are, on the one hand, axial, short, pin-shaped positioning studs of the support-holding section 26, which studs engage into corresponding openings in the support part 6 or the housing wall 8 for positionally correct alignment. On the other hand, the motor-holding section 24, for example, FIGS. 2, 5 and 7, also has pin-like, axial studs which engage into corresponding openings in the motor 2 or the end-insulating shank 32.

It is furthermore advantageous if the motor-holding section 24 is connected in one piece to a covering wall 82 which covers the region of the connecting pieces 28 and thus axially shields the connecting pieces 28 against live parts of the electric motor 2. As is shown, the stop webs 62 are integrally molded onto this covering wall 82. The covering wall 82, which is molded in one piece together with the motor-holding section 24, is especially advantageous for an embodiment in which the connecting pieces 28 are designed as metallic, and therefore electrically conductive, spring elements. This is because an air seepage path could possibly form between the metallic parts of the fan 10 and axially opposite, live parts of the motor 2. According to the invention, however, by means of the covering wall 82, isolation of the air-creepage paths between the connecting pieces 28 and the electric motor 2 is ensured. A printed circuit board 84 can advantageously be fastened to the covering wall 82 approximately parallel to the latter (FIG. 1), this printed circuit board 84 having a control circuit for the motor 2 and being arranged axially between the stator 14 and support element 12. The covering wall 82 expediently has axial latching studs 86 engaging, for the mounting, in openings in the printed circuit board 84. The covering wall 82 is matched, with respect to its surface shape and size, to the printed circuit board 84 in such a manner that it shields at least all of the live regions of the printed circuit board 84 in the direction of the connecting pieces 28.

Figure 15:
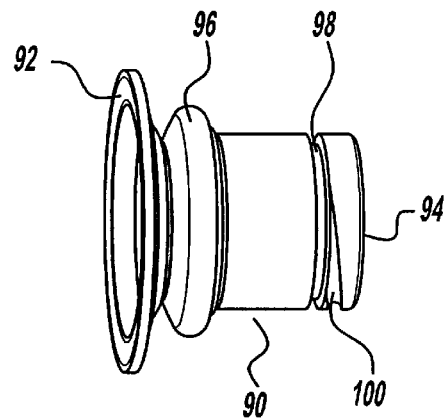
FIG. 15 shows a perspective view of a shaft seal in an alternative refinement to FIG. 1.

Mention should also be made of the fact that the support element 12 has a central lead-through opening 88 for the motor shaft 20. There is expediently mounted in this region of the lead-through opening 88 a special shaft seal 90, which is essentially designed as a tubular or bellows-like hollow body and bears, with a first, end sealing edge 92, axially against the support part 6 and, with a second, end sealing edge 94, axially against the electric motor 2. The shaft seal 90 in this case coaxially surrounds the motor shaft 20. According to FIG. 1, it consists of a cylindrical section which faces the motor 2 and merges into a section which widens approximately in a bell-shaped manner in the direction of the fan 10. In the embodiment of the shaft seal 90 which is illustrated in FIG. 15, said shaft seal has, between the cylindrical section and the section widening in a bell-shaped manner, a folded section 96, as a result of which the axial elasticity is increased. The shaft seal 90 is mounted directly within the lead-through opening 88 in the motor-holding section 24, for which purpose it has a peripheral annular groove 98 in which the opening edge of the lead-through opening 88 engages. According to FIG. 15, an introductory channel 100, which starts from the second sealing edge 94, runs helically and merges into the annular groove 98, can be provided to make assembly easier. The shaft seal 90 consists of a rubber-elastic and preferably also electrically conductive material, as a result of which it advantageously also ensures equipotential bonding between the fan 10 and motor 2. According to FIG. 1, the shaft seal 90 is seated in a positionally fixed manner, i.e. in a non-rotating manner, between the housing wall 8 and a bearing ring on the stator side.

Figure 4:
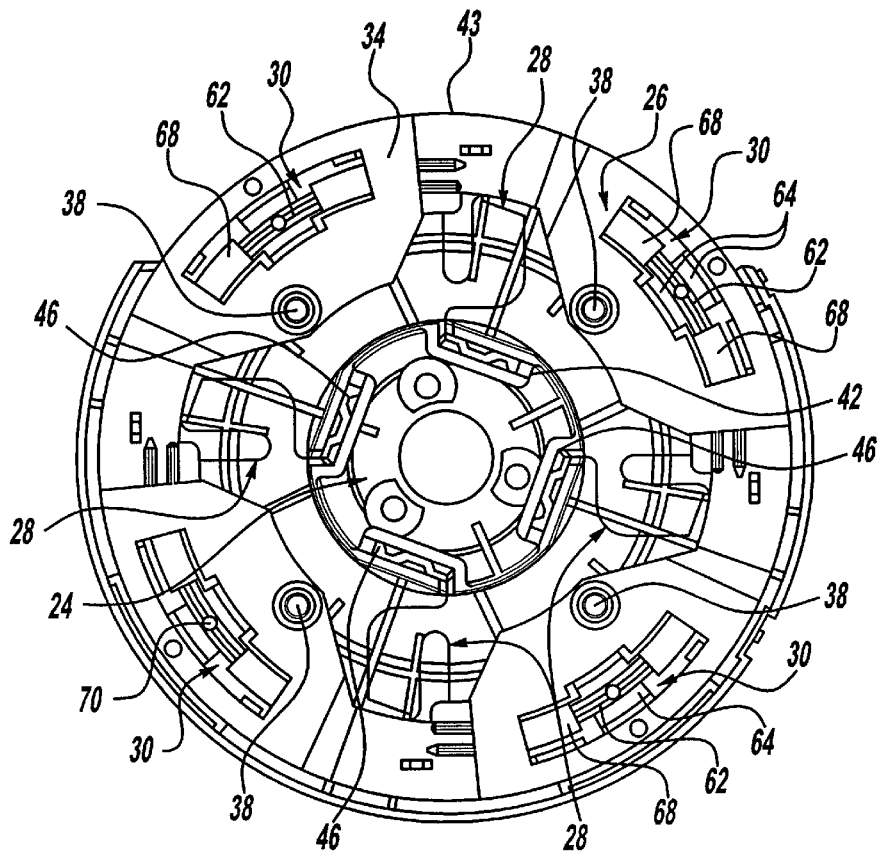
FIG. 4 shows a view of the opposite end side in the arrow direction IV according to FIG. 2.

Mention should furthermore be made of the fact that, in the preferred exemplary embodiment, the two holding sections 24 and 26 are connected via four connecting pieces 28 which are distributed uniformly over the circumference and are thus spaced apart by 900 in the circumferential direction. The stop means 30 are each expediently arranged in the angular regions lying between the connecting pieces 28 in the circumferential direction, with the result that a quadruple arrangement of the stop means 30 is likewise preferably provided (FIG. 4).

As far as the assembly is concerned, first the support element 12 according to the invention is completely assembled. It is then screwed onto the electric motor 2, preferably via three screws, the positioning means 80 engaging in corresponding openings on the end insulating shank of the motor. The housing wall 8 of the fan 10, which housing wall faces the motor 2, is then placed onto the support-holding section 26 and is screwed on by means of screws (not shown). The fastening thus takes place from the inside of the fan 10. According to FIG. 1, the electric motor 2 can be covered, on its side which is remote from the fan 10, by a covering part 102, this covering part being fastened to the fan housing in particular directly via any desired mounting 104.

Figure 16:
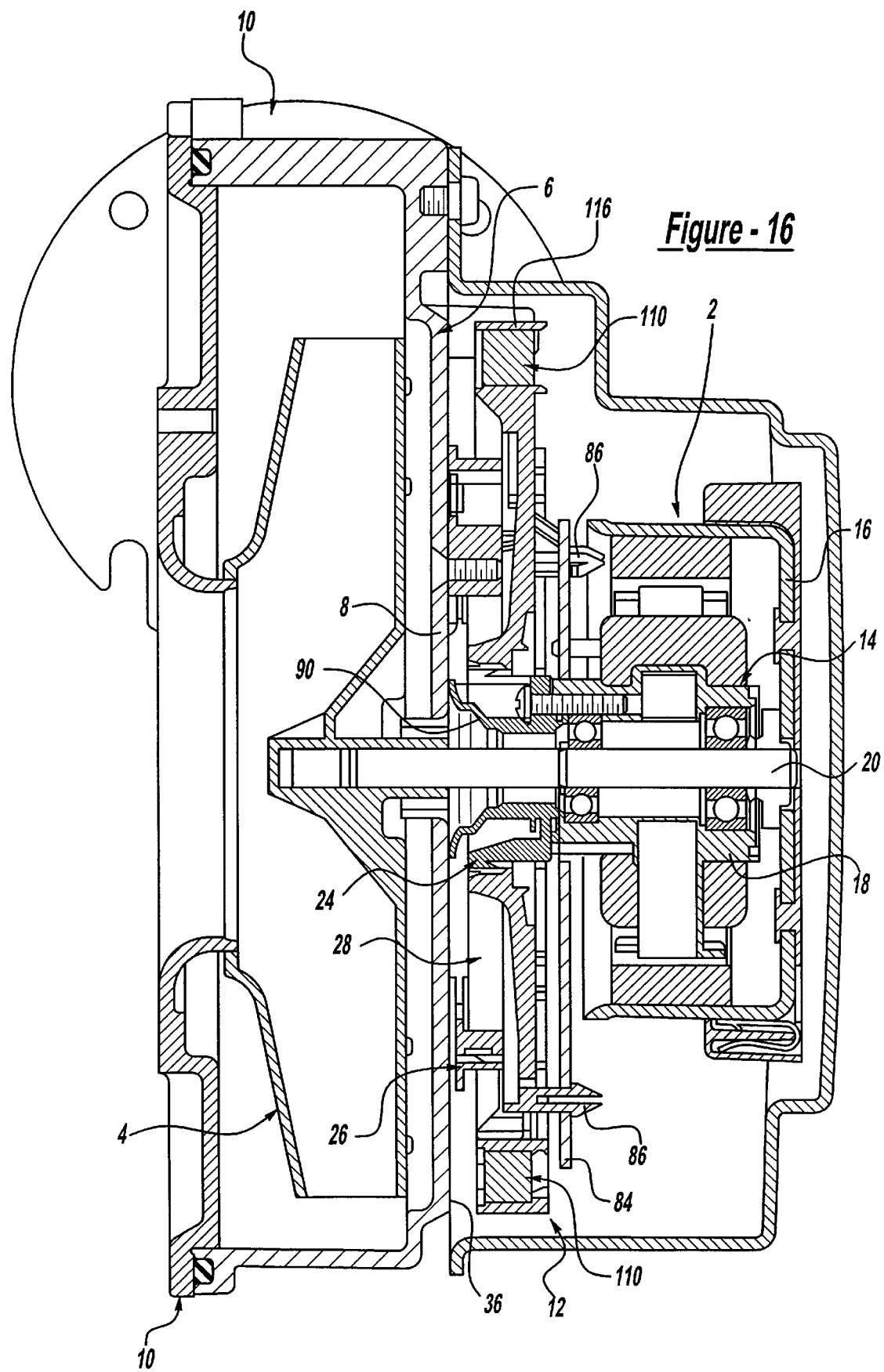
FIG. 16 shows a representation analogous to FIG. 1 with an advantageous design variant of the vibration-isolating arrangement according to the invention.

An advantageous refinement of the invention will now be explained with reference to FIGS. 16 to 18. This embodiment is based on the following problem.

When d.c. motors are used, vibrations excited by commutation are inevitably produced. Excitations due to residual unbalances also occur and likewise have to be isolated by the vibration isolation. It has been proven in this connection that, in the design of the vibration isolation, not only do the static natural frequencies have to be taken into account but additionally also the dynamic natural frequencies which are determined by mutation vibrations of the rotatory system, in the present application, of the rotating rotor. The preferred embodiment according to FIGS. 16 to 18 is based on the finding that the effects of the dynamic natural frequencies occurring in the range of rotational speed to be taken into account can only be reduced inadequately by only reducing the unbalance of the rotating system.

The invention therefore makes provision consciously to increase the mass of the vibrating, but not rotating parts. This is achieved according to the invention by (at least) one additional mass 110 which is fastened or can be fastened on the motor side to influence the vibration behavior (resonance). This additional mass 110, which can only be seen in section in FIG. 16, is fastened or can be fastened in particular to the motor-holding section 24 of the support element 12.

Figure 17:
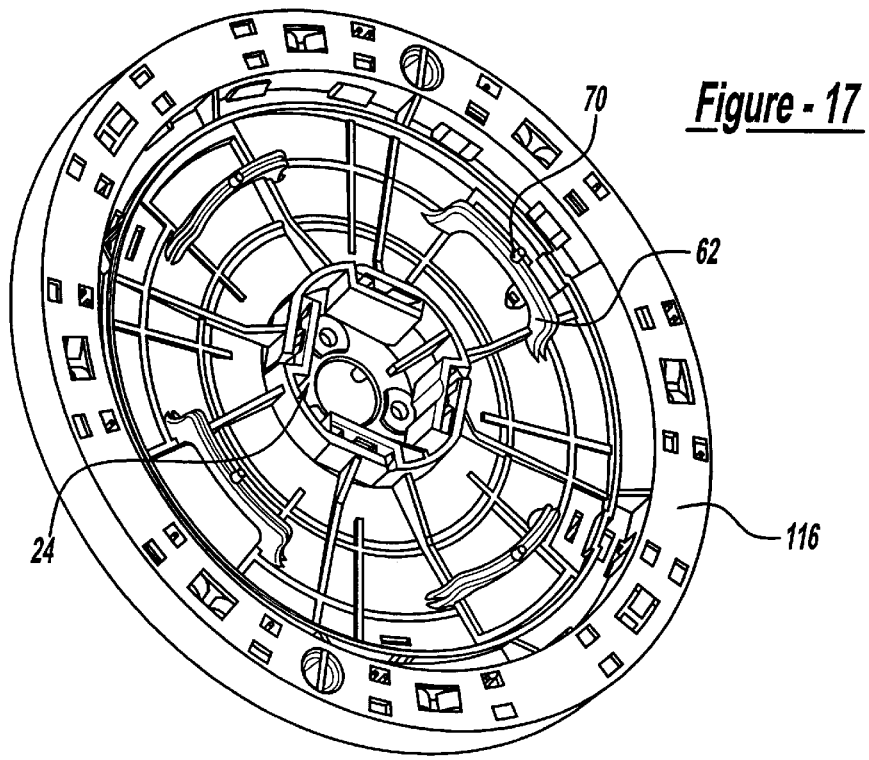
FIGS. 17 and 18 show perspective views of the motor-holding section of the support element in the design according to FIG. 16.
Figure 18:
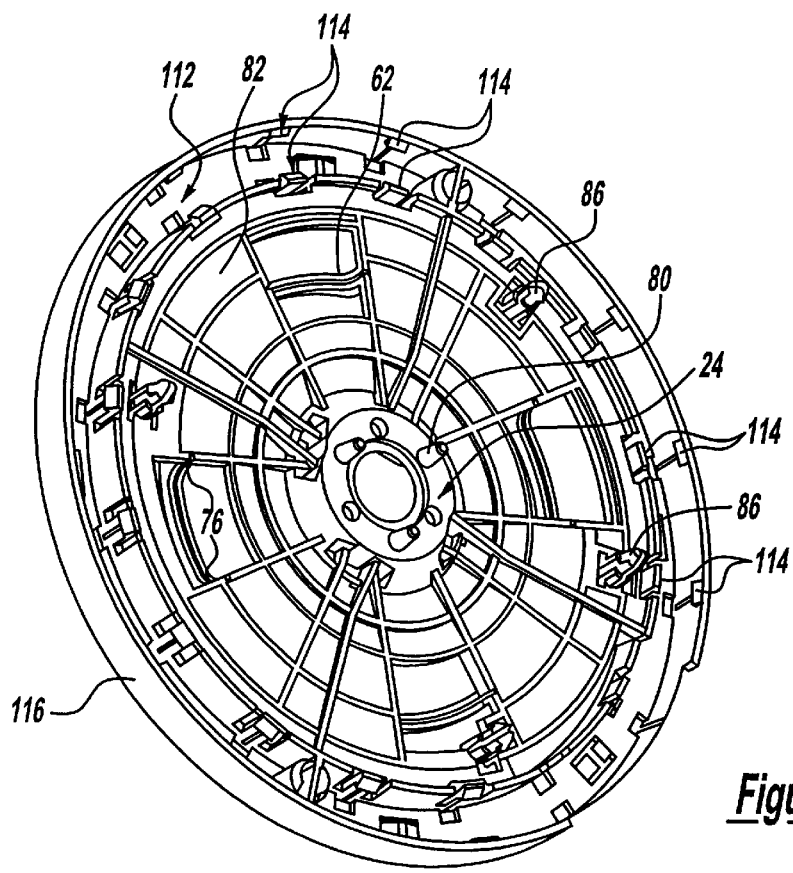

As is seen in FIGS. 17 and 18, for this purpose the motor-holding section 24 has, in its outer circumferential region, an annular receiving chamber 112 which is coaxial with respect to the motor shaft 20 and into which the additional mass 110 is inserted or can be inserted, in particular releasably, via latching means 114. The receiving chamber 112 is preferably formed by an annular section 116 which, seen in axial section, is U-shaped, is open in an axial direction and is connected in one piece to the motor-holding section 24. In this case, the additional mass 110 is of correspondingly annular design; for example, in the form of a thick, annular steel disk. The annular additional mass 110 can be of one piece design in the circumferential direction. However, in the preferred design which is shown, the additional mass 110 consists of (at least) two individual segments or sectors which are accordingly in each case of approximately semicircular design. The latching means 114 consist in each case of a pair of radially opposite latching lugs between which the additional mass 110 can be clipped. The pairs of latching lugs are here distributed uniformly over the circumference, with the result that the additional mass 110 is securely mounted. As an alternative to the preferred latching means 114, other types of fastening are also conceivable, for example, encapsulation by injection molding (molding into the plastic material) or bonding. It is furthermore possible to form the additional mass 110 in the axial direction from a plurality of relatively thin disks or disk parts.

The additional mass according to the invention serves to displace the center of gravity of the system, advantageously in the direction of the motor shaft, this having a favorable effect on the vibration isolating characteristics of the system.

It should be noted at this point that the measure of providing an additional mass to influence the vibration behavior can basically also be used without the defining features of claim 1. To this extent, this concerns an inventive concept which is independent of claim 1.

The invention is not restricted to the exemplary embodiments shown and described but rather also comprises all designs which act in an identical manner within the meaning of the invention. Furthermore, the invention is also not as yet restricted to the combination of features defined in claim I but rather can also be defined by any other combination of certain features of all the individual features disclosed as a whole. This means that basically any individual feature of claim 1 can in practice be omitted or replaced by at least one individual feature disclosed at another point of the application. To this extent, claim 1 is to be understood merely as a first formulation attempt for an invention.

We claim:

1. An arrangement for a vibration-isolating mounting of an electric motor (2) on a support part (6) comprising an essentially disk-shaped support element (12), the support element (12) having a motor-holding section (24) for connection to the electric motor (2) and a support-holding section (26) for connection to the support part (6), and the two holding sections (24, 26) being connected via elastic, web-like connecting pieces (28), wherein the connecting pieces (28) are designed such that the two holding sections (24, 26) are elastically movable relative to each other three-dimensionally in all directions in space, specifically axially, radially and tangentially, over a certain movement play, the support element (12) having integrated stop means (30) for the three-dimensional limiting of the elastic relative movements of the holding sections (24, 26).

2. The arrangement as claimed in claim 1, wherein the two holding sections (24, 26) and the connecting pieces (28) are formed by originally separate component parts, the connecting pieces (28) preferably being connected via non-positive and/or positive-locking connections in the radially outer region to the support-holding section (26) and in the radially inner region to the motor-holding section (24).

3. The arrangement as claimed in claim 2, wherein the holding sections (24, 26) and the connecting pieces (28) are different materials, the holding sections (24, 26) comprising a first plastic and the connecting pieces (28) comprising a second plastic or metal, in particular a spring steel plate.

4. The arrangement as claimed in claim 2, wherein each connecting piece (28) is seated by its radially outer end region, in a holding receptacle (44) of the support-holding section (26) and, by its radially inner end region, in a holding receptacle (46) of the motor holding section (24).

5. The arrangement as claimed in claim 1, wherein each connecting piece (28) comprises an elastic strip material which, with respect to its transverse axis running over the width of the strip, is aligned parallel to the motor axis.

6. The arrangement as claimed in claim 1, wherein each connecting piece (28) has, between its radially outer and inner end regions which lie opposite each other in the radial direction approximately on the same radius, an extended profile which increases the elastic movability for each connecting piece (28) having, between its end regions, an approximately S-shaped profile having three sections (54) which are aligned approximately radially and are connected via bends (52).

7. The arrangement as claimed in claim 1 wherein the stop means (30) are at least partially formed by elements of the holding sections (24, 26), wherein the elements are elastically deformable in such a manner that relative movements are elastically damped.

8. The arrangement as claimed in claim 1, wherein, in the region of the stop means (30), the holding sections (24, 26) interlock radially and axially with a corresponding movement play.

9. The arrangement as claimed in claim 1, wherein one holding section (24) has a plurality of stop webs (62) which are distributed over the circumference, run in particular in the shape of a circular arc in the circumferential direction and are in each case axially and radially engaged around by at least two claw-like stop pieces (64) of the other holding section (26), the stop pieces (64) preferably being of elastic design in the radial direction such that when the two holding sections (24, 26) are joined together axially, the stop webs (62) can in each case be latched radially between the two associated stop pieces (64).

10. The arrangement as claimed in claim 9, wherein the claw-like stop pieces (64) ensure, in interaction with the stop webs (62), a limiting stop in an axial direction.

11. The arrangement as claimed in claim 9, wherein the holding section (26) having the stop pieces (64) has, on the axially opposite side, stop elements (68) which are elastically deformable axially, and in each case ensure, in interaction with the stop webs (62), a limiting stop, which is elastic, in the other axial direction.

12. The arrangement as claimed in claim 9, wherein in the case of tangential relative movement, of the two holding sections (24, 26), the stop pieces (64) interact with stop surfaces (76) formed in the end region of the stop webs (62).

13. The arrangement as claimed in claims 9, wherein in the case of radial relative movement of the two holding sections (24, 26) at least one of the stop webs (62) interacts with at least one radially opposite and in particular elastically deformable stop element (78) of the other holding section (26).

14. The arrangement as claimed in claim 1, wherein the motor-holding section (24) has a covering wall (82) which covers the region of the connecting pieces (28) and axially separates them from the electric motor (2).

15. The arrangement as claimed in claim 1, wherein a printed circuit board (84) is arranged axially between the electric motor (2) and the support element (12), the printed circuit board is mounted on the covering wall (82) by axial latching studs (86) which engage in the printed circuit board (84).

16. The arrangement as claimed in 1, wherein the support element (12) has a central lead-through opening (88) for a motor shaft (20), there being provided a shaft seal (90) which is mounted on the support element (12), essentially designed as a tubular hollow body which surrounds the shaft (29) and bears, with a first, end sealing edge (92), axially against the support part (6) and, with a second, end sealing edge (94), axially against the electric motor (2), and the shaft seal (90) comprising a rubber elastic and preferably electrically conductive material.

17. The arrangement as claimed in claim 1, which comprises an additional mass (110) which is fastened or can be fastened on the motor side to influence the vibration behavior.

18. The arrangement as claimed in claim 17, wherein the additional mass (110) is fastened or can be fastened to the support element (12), in particular to the motor-holding section (24).

19. The arrangement as claimed in claim 17, wherein the motor-holding section (24) has, in its outer circumferential region, an annular receiving chamber (112) which is coaxial with respect to a motor shaft (20) and into which the additional mass (110) is inserted or can be inserted, in particular releasably, via latching means (114).

20. The arrangement as claimed in claim 17, wherein the essentially annular additional mass (110) consists of at least two segments.

* * * * *